July 17, 1934.  G. THORNTON-NORRIS  1,967,157
TIME MEASURING INSTRUMENT
Filed Dec. 15, 1931   2 Sheets-Sheet 1
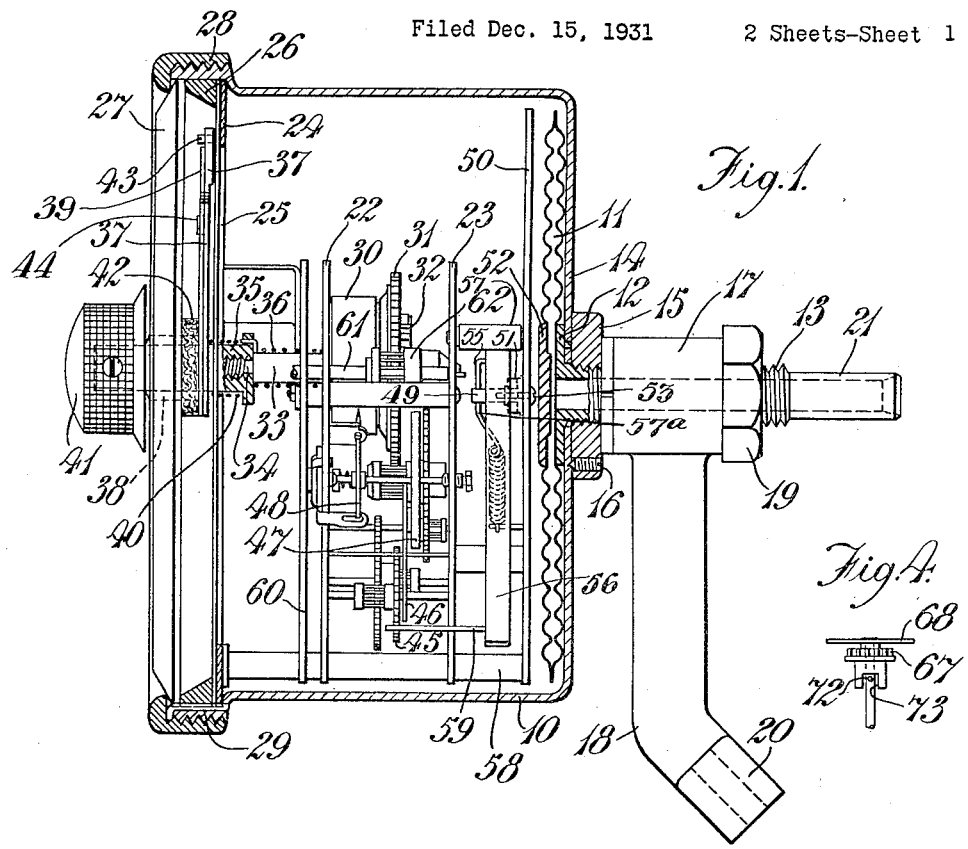
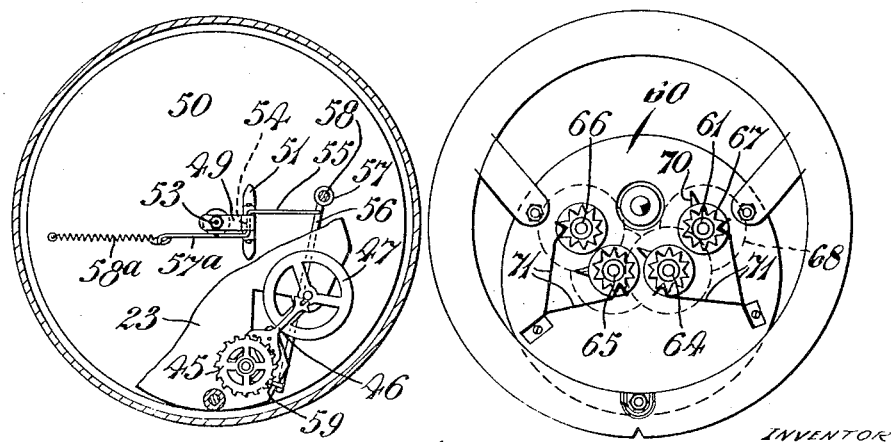
INVENTOR
George Thornton-Norris
By Lacey & Lacey,
Attys July 17, 1934.  G. THORNTON-NORRIS  1,967,157
TIME MEASURING INSTRUMENT
Filed Dec. 15, 1931  2 Sheets-Sheet 2
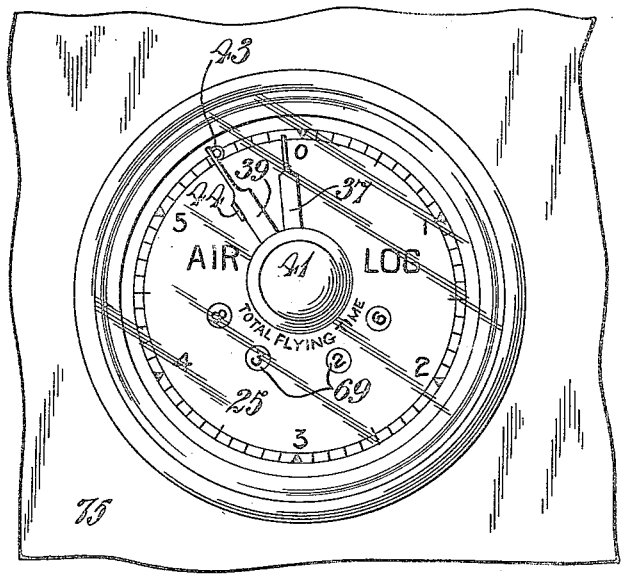
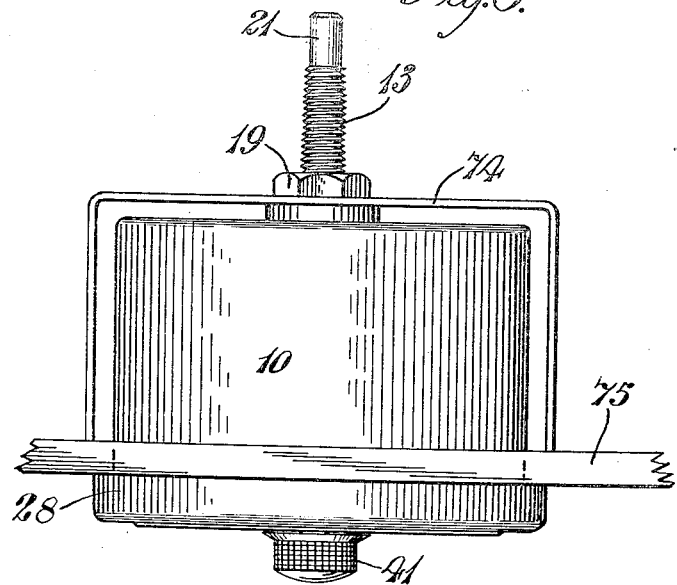
George Thornton-Norris INVENTOR
By Lacey & Lacey,
Attys Patented July 17, 1934

1,967,157

UNITED STATES PATENT OFFICE 1,967,157

TIME MEASURING INSTRUMENT

George Thornton-Norris, London, England

Application December 15, 1931, Serial No. 581,257
In Great Britain December 18, 1930

2 Claims. (Cl. 161—15)

This invention relates to time measuring instruments of the kind in which a clockwork mechanism is adapted to integrate and indicate the total time of operation of an engine, machine, vehicle or the like.

The object of the present invention is to provide a robust and compact form of instrument adapted more particularly for use in showing the total flying time of an aircraft, although it is equally applicable for use with motor-cars and other vehicles and for similar purposes.

An instrument for indicating the flying time of an aircraft which has previously been proposed, consists in the combination of a stop watch or like mechanism with air pressure operated means, which latter may be connected with the usual Pitot tube or a Venturi tube, the stop watch being arranged with an independent winding knob in the customary manner.

In an instrument for integrating the total time of operation of moving objects, such as aircraft, comprising a clock mechanism having indicating means arranged to be readily re-set to zero, according to the invention the action of re-setting serves automatically to rewind the clock mechanism, which latter is controlled by fluid pressure actuated means, such as a diaphragm or capsule, to be connected with a source of variable pressure by means of a pipe line. Preferably the indicating means comprises a scale and a main hand provided upon or in connection with an arbor for winding the clock mechanism and an auxiliary hand mounted frictionally relative to the main hand for increasing the effective range of the scale, while means may be provided for integrating the total time of operation irrespective of the re-setting of the main hand.

One form of instrument according to the present invention is illustrated in the accompanying drawings, in which:—

Figure 1 is a side sectional elevation to an enlarged scale;

Figure 2 shows the releasing mechanism in front elevation, the dial and a portion of the spring motor being removed;

Figure 3 is a front elevation of the movement of the instrument showing the operating mechanism of the perpetual time log;

Figure 4 shows a detail of construction of the time log;

Figure 5 is a front elevation of the instrument fitted into a dash-board or instrument panel; and Figure 6 is a plan view corresponding to Figure 5.

The instrument shown in the drawings is especially adapted for installation upon an aircraft in connection with the usual air tube of an air speed indicator or alternatively for connection with an independent Pitot tube or other air pressure device of a similar nature. It is applicable also for connection with oil pressure systems, such as those of internal combustion engines.

The instrument is contained within a cup-like outer casing 10, the rear wall 14 of which accommodates a flat elastic capsule 11 of the usual kind. The central boss or plate 12 of the capsule 11 is formed with an axially extending nipple 13 which passes through the rear wall 14 of the casing 10 and is secured in place by means of a nut 15 which in turn is prevented from accidental loosening by means of a locking screw 16. The nipple 13 passes through the boss 17 of a fixing bracket 18 and is clamped therein by means of a nut 19, the bracket 18 being of substantially T-shaped formation and the cross-piece 20 being adapted for attachment to any convenient part of the aircraft or the like. The air pressure in the Pitot tube or in an associated air speed meter is communicated to the air capsule 11 by means of a rubber tube and T or Y piece, or other suitable connection which passes over the unthreaded portion 21 of the nipple 13.

The controlled spring motor or clock mechanism, held between the side plates 22 and 23, is supported within the casing 10 by means of an annular ring 24. This ring, a dial plate 25, a bezel ring 26 and the front glass 27, are clamped within the front portion of the casing 10 by means of a screwed ring 28, rotation of these elements being prevented by means of an L-shaped pin 29 which is located in the slots cut in the various components.

The spring 30 of the clock movement and the usual gear wheel 31 and associated ratchet mechanism 32 are mounted upon a winding arbor 33 formed at its end with a left-handed screw portion 34. An operating shaft 35 is screwed upon the end of the arbor 33 and is also held in engagement therewith by means of a clutch spring 36 which is coiled around the arbor 33 in a right-hand direction the inner end of said spring 36 being free so as to serve as a friction clutch for allowing a partial unwinding of the operating shaft 35 from the screw-portion 34. The operating shaft 35 carries a short radial hand 37 which is firmly secured thereto by means of a collar 38 while an auxiliary longer hand 39 is frictionally mounted upon the shaft 35 by means of a coiled compression spring 40. The shaft 35 passes through a hole in the glass 27 at the outside of which it is provided with an operating knob 41, the ingress of moisture and dust through the hole in the glass 27 being prevented by means of a washer 42.

The hands 37 and 39 are adapted to indicate trip duration upon the dial plate 25 which is marked in hours and tenths as shown in Figure 5. A pin 43 extends forwardly from the dial plate 25 and is adapted to engage the frictionally mounted hand 39 so that, although the two hands 37 and 39 are usually superimposed and are brought into register by means of a stop 44 upon the hand 39, the stop 43 may engage the hand 39 and arrest its motion while the hand 37 continues to travel forward.

The wheel train between the plates 22 and 23 is similar in form to those usually employed in clock mechanisms and terminates in an escapement wheel 45, movement of which is controlled by means of an escapement lever 46 and balance wheel 47 which in turn is actuated by means of a spiral hair-spring 48 in the usual manner.

The means employed for controlling the rotation of the escapement wheel 45 is shown more particularly in Figure 2 and comprises a bell crank lever 49 pivoted upon a rear plate 50 by means of lugs 51 and actuated by a plate 52 upon the front of the air capsule 11, and an adjacent screw 53 is provided upon the bell crank lever 49 in order that the point of release may be adjusted. The outstanding arm 54 of the bell crank lever 49 is coupled by means of a wire link 55 with a lever 56, near the upper end of the lever, the end 57a of the link 55 being connected with a tension spring 58a for returning the release mechanism to its "stop" position. The lever 56 is pivotally mounted at its upper end by means of a sleeve 57 upon one of the spacing members 58 which support the rear plate 50, and the lower end of the lever 56 carries a wire 59 which normally engages the teeth of the escapement wheel 45 as shown in Figure 2. The wire 59 is so formed that, when in its innermost position, it bears against the edge of the plate 23 and also extends between the teeth of the wheel 45, thus stopping said wheel without straining the pivotal mounting thereof. As the wire 59 does not touch the circumference of the escapement wheel 45 but engages the leading edge of one of the teeth thereof, the escapement wheel 45 is arrested in such a position that the pallets are free, the hair-spring being adjusted to assume a position slightly to one side of its central position so that the escapement is sure to start when the wire 59 is withdrawn from the teeth, however slowly this operation is performed.

The escapement lever 46 and balance wheel 47 are so set that immediately upon the withdrawal of the wire 59 from the teeth of the escapement wheel 45, the clock motion is set in operation, thus causing the arbor 33 to revolve in a clockwise direction and indicate the duration of operation upon the dial 25. Thus when the instrument is installed upon an aircraft and the capsule 11 is connected with a Pitot tube, Venturi tube or the like, the speed of the aircraft relative to the air generates air pressure in the capsule 11 which thereby expands and pushes the adjusting screw 53 forwardly of the instrument, thereby moving the wire 59 through the medium of the link 55 and allowing the clock mechanism to operate. The forward movement of the screw 53 rocks the bell-crank 49 so that the latter causes the link 55 to push the lever 56 and cause the lower end of said lever to swing from the escapement wheel.

As the escapement wheel 45 is normally influenced to rotate under the action of the spring 30, it will be observed that the outward movement of the wire 59 is impeded to a small extent due to friction between it and the teeth of the escapement wheel 45, and this has the effect of delaying the starting of, the instrument until the aircraft reaches a speed which is slightly in excess of the speed at which the instrument normally ceases to integrate. This gives the additional advantage that the instrument cannot be started by wind when the aircraft is stationary, even if set to stop at very slow flying speeds.

In the normal operation of the instrument the hands 37 and 39 are set to zero by rotating the operating knob 41 in an anti-clockwise direction, thus automatically winding up the spring 30. It is quite possible that when this operation is performed the teeth of the usual ratchet mechanism 32 for allowing the spring to be wound without necessarily driving the train may be so disposed that it is impossible to locate the hands exactly upon the zero of the scale and in this case the hands are moved further until the hands touch the stop 43, said hands being then moved to the zero position in a clockwise direction. This has the effect of unscrewing the shaft 35 to a slight extent, the drive being taken by the friction clutch spring 36. Should the time of flight be sufficient to cause the hands to pass the stop 43 the hand 39 will be left behind, thus indicating this fact, when due allowance may be made by the pilot or operator and in re-setting the instrument to zero by rotation of the knob 41, the hand 37 engages the stop 44 as the hand 39 is turned back to the stop 43 thereby bringing both hands into register for movement forward to the zero of the scale.

An integrating mechanism, shown more particularly in Figures 3 and 4, is incorporated upon a front plate 60 and is driven by means of a spindle 61 which is in engagement by means of a pinion 62 with the gear wheel 31, thus integrating and indicating in a permanent manner the total time for which the clock mechanism has been in operation. The integrating train comprises a number of spindles 61, 64, 65 and 66 each provided with a rotatably mounted gear wheel 67 and an indicating disc 68 which latter is marked from 0 to 9 for indicating through apertures 69 in the dial 25. The wheels 67 upon the spindles 61, 64 and 65 are each provided with a flange bearing a single tooth 70 which is adapted, as it rotates past the next adjacent wheel 67, to move the latter through an angle corresponding to a single tooth and thus advance the number indicated by the disc 68 through the corresponding aperture 69. Springs 71 which are bent at their ends to engage between the teeth in said wheels 67 serve to prevent accidental movement of the wheels 67 and also position said wheels so that the indications are correctly centred behind the apertures 69. In addition the spindle 61 drives the corresponding wheel 67 and its associated indicator disc 68 by means of a pin 72 which engages in a comparatively wide slot 73 formed in the lower portion of the wheel 67, thus allowing a considerable amount of backlash in the drive and thereby causing the figures upon the disc 68 to be retained in a suitable position for viewing through the apertures 69 for an increased period of time, the figures upon all the discs 68 jumping into view under the influence of the springs 71.

An alternative form of mounting suitable for dashboards and instrument panels is shown in Figure 6 in which a U-shaped strip 74 is passed over the nipple 13 and is adapted to bear against the rear surface of the dashboard or equivalent 75 by means of the nut 19. If desired the back 14 of the casing 10 may be reinforced by means of a disc or stiffener (not shown) for preventing distortion of the casing 10.

Although one form of construction has been illustrated and described, it will be observed that various modifications may be made without departing from the invention. Thus, any convenient form of re-setting device may be employed while the arrangement of the hands and integrating mechanism may be suitably re-arranged in accordance with any particular requirements. Moreover, a plurality of capsules may be incorporated in the instrument for releasing the time indicating mechanism, or diaphragms, pistons or equivalent may be utilized.

The invention is applicable for use in connection with a variety of instruments for vehicles or machines, the particular releasing means employed for controlling the clock escapement or equivalent being adapted to suit requirements. Further, any suitable form of fluid pressure operated releasing device may be used and this may be arranged to start the clock when the escapement is released, or starting may be effected by the vibration of the aircraft, while any form of clock or equivalent movement may be utilized. The operation of the clock may be continuous, the indicating and/or integrating mechanism being engaged or disengaged for controlling the integration.

What I claim is:—

1. A device for indicating the flying time of aircraft comprising a time integrating mechanism including a motor spring, a flexible diaphragm, means operatively connected to the time integrating mechanism for winding said spring, a main indicating hand, a loose auxiliary indicating hand mounted concentric with the main hand, a friction clutch for connecting both hands for movement as a unit, means operatively connecting the diaphragm to said time integrating mechanism whereby movement of the diaphragm starts and stops said mechanism, and means adapted to expose the diaphragm to variable air pressure.

2. A device for indicating the flying time of aircraft comprising a clock mechanism, a flexible diaphragm, said clock mechanism having a controlling escapement wheel, a pivoted obstructing member adapted to engage between the teeth of the wheel, means to prevent the obstructing member from exerting radial pressure upon the escapement wheel, a bell-crank lever arranged adjacent the diaphragm to be actuated thereby, means yieldably holding the bell-crank lever to the diaphragm, connections between the bell-crank lever and the obstructing member, whereby movement of the diaphragm actuates said member to start and stop said clock mechanism, and means adapted to expose the diaphragm to variable air pressure.

GEORGE THORNTON-NORRIS.